(12) United States Patent  
Sauer et al.

(10) Patent No.: US 7,703,442 B2  
(45) Date of Patent: Apr. 27, 2010

(54) METHOD FOR OPERATING AN INTERNAL COMBUSTION ENGINE

(75) Inventors: Christina Sauer, Benningen (DE); Andre F Casal Kulzer, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/473,082

(22) Filed: May 27, 2009

(65) Prior Publication Data

US 2009/0229566 A1    Sep. 17, 2009

Related U.S. Application Data

(62) Division of application No. 11/708,803, filed on Feb. 20, 2007.

(30) Foreign Application Priority Data

Feb. 20, 2006   (DE) ................. 10 2006 007 719

(51) Int. Cl.  
*F02M 7/00* (2006.01)  
*F02D 41/00* (2006.01)

(52) U.S. Cl. .................. 123/435; 123/676; 123/699

(58) Field of Classification Search ................. 123/435, 123/672, 676, 698, 699, 305, 316, 568.14, 123/568.21  
See application file for complete search history.

(56) References Cited

U.S. PATENT DOCUMENTS

| | | | |
|---|---|---|---|
| 5,355,677 A * | 10/1994 | Hawkins et al. | 60/609 |
| 6,199,369 B1 * | 3/2001 | Meyer | 60/39.6 |
| 6,336,436 B1 * | 1/2002 | Miyakubo et al. | 123/295 |
| 7,406,937 B2 * | 8/2008 | Kulzer et al. | 123/179.3 |
| 7,588,019 B2 * | 9/2009 | Casal Kulzer | 123/568.14 |
| 2002/0046741 A1 * | 4/2002 | Kakuho et al. | 123/568.14 |
| 2002/0078918 A1 * | 6/2002 | Ancimer et al. | 123/295 |
| 2005/0211219 A1 * | 9/2005 | Strom et al. | 123/299 |
| 2006/0288966 A1 * | 12/2006 | Yang | 123/27 R |
| 2007/0227517 A1 * | 10/2007 | Casal Kulzer | 123/568.14 |
| 2008/0156305 A1 * | 7/2008 | Karrelmeyer et al. | 123/672 |

* cited by examiner

*Primary Examiner*—John T Kwon  
(74) *Attorney, Agent, or Firm*—Kenyon & Kenyon LLP

(57) ABSTRACT

In an internal combustion engine, gasoline is injected directly into a combustion chamber and ignited by auto-ignition. The characteristics map range within which fuel is ignited by auto-ignition is enlarged by supercharging the internal combustion engine.

20 Claims, 2 Drawing Sheets

METHOD FOR OPERATING AN INTERNAL COMBUSTION ENGINE

CROSS-REFERENCE TO RELATED APPLICATION

This application is a divisional of, and incorporates herein by reference in its entirety, U.S. patent application Ser. No. 11/708,803, which was filed on Feb. 20, 2007 and which claims priority under 35 U.S.C. § 119 of German Patent Application No. DE 102006007719.9 filed on Feb. 20, 2006.

FIELD OF THE INVENTION

The present invention relates to a method for operating an internal combustion engine. The present invention also relates to a computer program, an electric memory medium, a control and/or regulating device for an internal combustion engine.

BACKGROUND INFORMATION

Although not yet mass produced, internal combustion engines having injection of gasoline directly into the combustion chamber and auto-ignition as in the diesel principle are known. This operating mode is referred to below as "homogeneous auto-ignition." Additional savings in fuel consumption are expected with this homogeneous auto-ignition operating mode of gasoline engines, and emission results should be even better than with internal combustion engines having direct gasoline injection and external ignition by a spark plug.

Homogeneous auto-ignition is achieved in a gasoline engine by virtue of the fact that a considerable portion of the combusted air-fuel mixture is not expelled into the exhaust but instead remains in the combustion chamber (so-called internal exhaust gas recirculation). The combusted air-fuel mixture is referred to below as residual gas (RG). With internal exhaust gas recirculation, either residual gas is retained in the combustion chamber (negative valve overlap) or residual gas is withdrawn back out of the exhaust channel or the intake channel (positive valve overlap) through variable triggering of the intake and exhaust valves at top dead center in the exhaust and refill charge cycle.

In the subsequent intake stroke, the residual gas is mixed with combustion air and fuel. Therefore, at the time of closing the intake valve(s), the gas mixture of combustion air and residual gas in the combustion chamber is at a much higher temperature than in normal operation. Compression of the gas mixture in the combustion chamber after the intake stroke causes the temperature to rise to the extent that the fuel-air mixture in the combustion chamber ignites spontaneously without external ignition by a spark plug. The goal of the homogeneous auto-ignition operating mode is that auto-ignition of the fuel-air mixture in the combustion chamber will occur approximately on reaching the ignition top dead center.

The residual gas has two important functions. First, the hot residual gas supplies heat, which, in combination with the rise in temperature in the compression stroke, allows auto-ignition of the fuel-air mixture.

The second function of the residual gas is to retard the kinetics of combustion triggered by auto-ignition to thereby reduce the mechanical load on the internal combustion engine, reduce noise production and prevent local temperature peaks from developing. Therefore, engine efficiency is improved as a result and operation of the internal combustion engine with little or even no NOx is possible because of the lower maximum temperatures.

These functions of the residual gas remaining in the combustion chamber at the same time result in restrictions on homogeneous auto-ignition operating mode to speeds amounting to approximately 50% of the maximum speed of the internal combustion engine. Furthermore, homogeneous auto-ignition operating mode may take place only up to a load of approximately ⅓ of full load of a naturally aspirated internal combustion engine. If the load is further increased, the reaction kinetics is greatly accelerated because of the reduced amount of residual gas, generating unwanted noise and resulting in a very high mechanical load on the internal combustion engine.

Another restriction on the range of use of homogenous auto-ignition operating mode occurs at speeds below 2000 rpm and at very low loads of 10% to 15% of full load, for example, because adequate cylinder filling with combustion air is impossible below this speed and at loads below 15%, and therefore this mode is not usable.

An object of the present invention is to provide a method for controlling an internal combustion engine and to provide an internal combustion engine which makes it possible to expand the characteristics map range within which the internal combustion engine is operated with homogeneous auto-ignition and therefore to further improve the emission and consumption performance of naturally aspirated internal combustion engines.

SUMMARY OF THE INVENTION

Due to the injection of combustion air into the combustion chamber according to the present invention at an overpressure above ambient pressure, the range of use of the homogeneous auto-ignition combustion method is expanded, so the emission and consumption advantages of this combustion method may be utilized on an even larger scale and the additional technical complexity caused by the "homogeneous auto-ignition" operating mode will be amortized more quickly.

With the help of supercharging of a gasoline engine that operates according to the homogeneous auto-ignition combustion method, it is possible to expand the speed range to up to 75% of the maximum engine speed and the load may be increased to 80% of full load of a comparable aspirated engine. The potential reduction in emissions and fuel consumption is quite substantial because the additional load and speed ranges gained with the help of the supercharging according to the present invention occur very often in everyday operation.

At the same time, by supercharging a homogeneous auto-igniting gasoline engine it is possible to control the ratio between residual gas and combustion air as well as the ratio between fuel and combustion air rapidly and with sufficient accuracy. In this way, the operating performance of an internal combustion engine that operates by the method according to the present invention is more stable in homogeneous auto-ignition operation.

In practical experiments, boost pressures of up to 2.3 bar absolute at the time of closing of the intake valves of a cylinder have proven feasible and advantageous.

To be able to very rapidly regulate/control the position of the combustion center point and even in synchronization with the stroke, the present invention also provides for the injection point(s) in time to be controlled in a targeted manner accordingly. Namely it has been found that the combustion center point may be influenced through the position and number of injection points in time. With nonsupercharged gasoline engines, start of injection SOI in homogeneous auto-ignition operating mode is in a range of 180° crank angle<start of injection<450° crank angle before top dead center of ignition, but with supercharged gasoline engines in homogeneous auto-ignition operating mode, a start of injection SOI in the range of 180° crank angle<start of injection<360° crank angle before top dead center of ignition has proven advantageous.

The combustion center point is the position of the piston when 50% of the fuel has been combusted.

In addition, it is also possible to use the injection pressure to control the operating performance of the internal combustion engine. It has proven advantageous here if the injection pressure is relatively low for injection of small quantities of fuel, in particular with multiple injections, whereas the injection pressure is increased for injection of large quantities of fuel. A pressure range between 30 bar and 200 bar has proven to be mostly adequate.

It has also proven advantageous if an internal exhaust gas recirculation depends on an instantaneous load. The internal combustion engine may also be controlled in this way in homogeneous auto-ignition operation. In practical experiments it has proven advantageous if in supercharged operation the residual gas content corresponds essentially to the residual gas content in nonsupercharged operation. At higher loads, more combustion air is converted, so the residual gas mass and with it the exhaust gas recirculation must then also be increased.

The advantages according to the present invention may also be implemented by a computer program operating by the method according to the present invention.

In addition, the advantages according to the present invention may also be implemented through a control and/or regulating device that operates according to this method and implemented by an internal combustion engine equipped with a corresponding control and/or regulating device.

It should be pointed out here that the method according to the present invention may essentially be used not only in four-stroke internal combustion engines but also in two-stroke internal combustion engines or also in six-stroke internal combustion engines. These different modes of operation may also exist in one and the same internal combustion engine, but at different operating points.

Although the principles of two-stroke and four-stroke operation have long been known, it should be pointed out with regard to six-stroke operation that an additional expansion stroke and an additional compression stroke are provided with this type of operation in order to achieve a better reaction performance of the fuel-air mixture in the combustion chamber. Such six-stroke operation is possible mainly when a comparatively low load is applied to the engine. The prerequisite for this is of course that it is possible to operate the intake and exhaust valves with the variability required.

DETAILED DESCRIPTION

Figure 1:
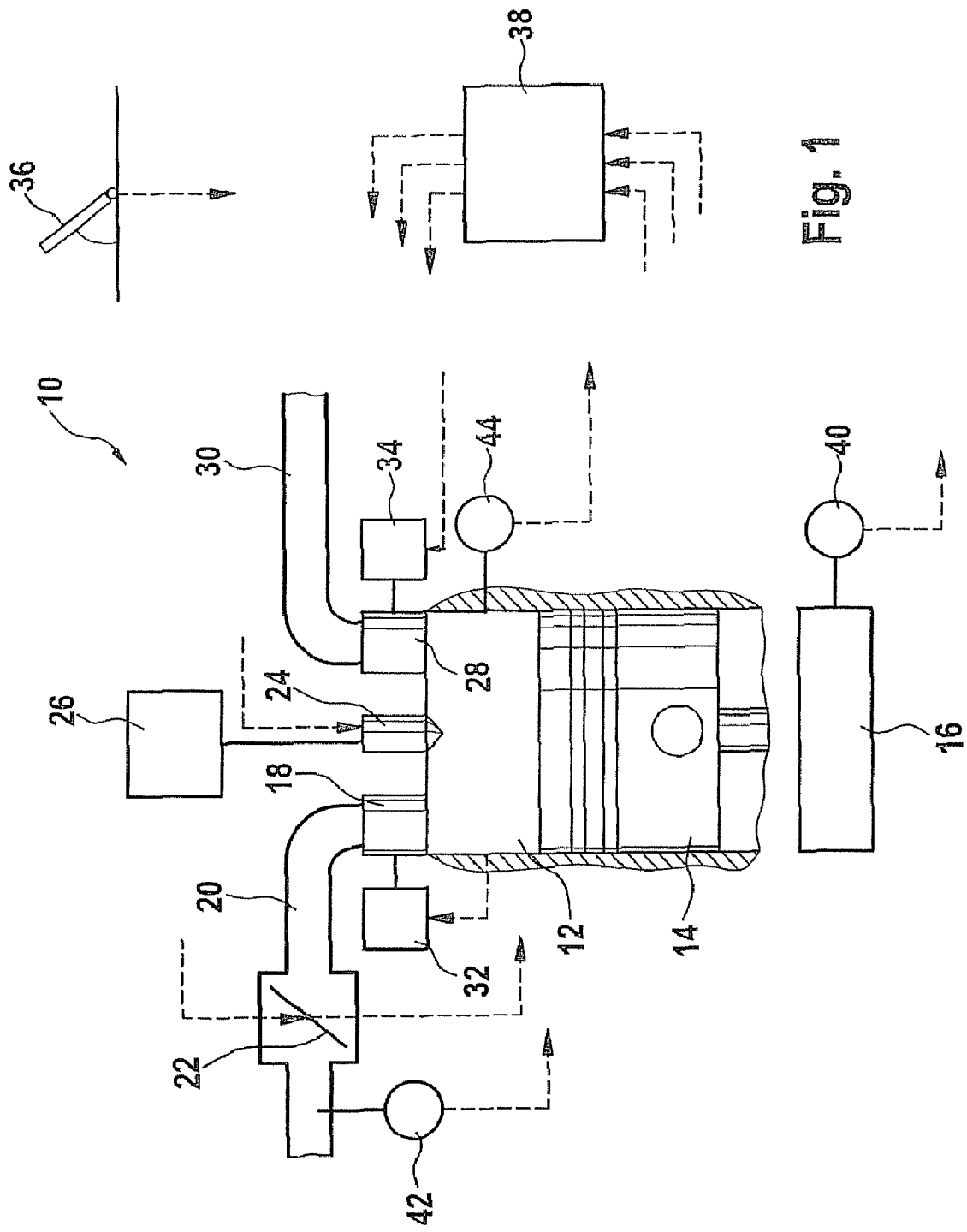
FIG. 1 shows a schematic diagram of an internal combustion engine according to the present invention.

FIG. 1 shows an internal combustion engine labeled as 10 on the whole. Its main function is to drive a motor vehicle (not shown). Internal combustion engine 10 has several cylinders, only one of which is shown in FIG. 1 for the sake of simplicity, having a combustion chamber 12 and a piston 14. Piston 14 is connected to a crankshaft 16. Combustion air enters combustion chamber 12 through an intake valve 18 and an intake channel 20 in which a throttle valve 22 is provided. The drawing does not show an exhaust turbocharger or a compressor which could help to blow combustion air into the combustion chamber.

Fuel is injected directly into combustion chamber 12 through an injector 24 which is supplied by a high-pressure fuel system 26. Simple or repeated direct injection permits a more controlled influence on homogenous auto-ignition operation in comparison with intake manifold injection.

Hot combustion exhaust gases are discharged from combustion chamber 12 through an exhaust valve 28 and an exhaust channel 30. Intake valve 18 is actuated by an adjustable camshaft 32; exhaust valve 28 is actuated by an adjustable camshaft 34. Ideally the internal combustion engine has a fully variable valve control.

A user of internal combustion engine 10 requests torque by operating an accelerator pedal 36. The operation of internal combustion engine 10 is controlled and regulated by a control and regulating device 38 which, among other things, processes the signals supplied by accelerator pedal 36. In addition, control and regulating device 38 receives signals from a torque sensor 40 which detects the rotational speed of crankshaft 16 from an HFM sensor 42 that detects the air mass flowing through intake channel 20 and from a pressure sensor 44 that detects the pressure prevailing in combustion chamber 12.

To adjust an operating point of internal combustion engine 10, injector 24 and throttle valve 22, among others, are triggered. The settings of intake camshaft 32 and exhaust camshaft 34 are influenced through appropriate signals from control and regulating device 38.

No spark plug is shown here because homogeneous auto-ignition operation is of interest in conjunction with the present invention.

The gasoline injected by injector 24 is auto-ignited by the rise in temperature of the gas trapped in combustion chamber 12 due to compression during the compression stroke.

In order to expand the characteristics map range within which homogeneous auto-ignition operation is possible, the charging pressure is used as an additional control variable according to the present invention.

This method is aimed at not only using different exhaust gas recirculation strategies, i.e., residual gas strategies and different injection strategies, in internal combustion engine 10 at different load points but also to inject the required combustion air under pressure into combustion chamber 12 as needed.

At a very low load, a strategy for residual gas storage in combustion chamber 12 is used for recirculating internal residual gas, this strategy involving exhaust valve 28 being closed before the end of an exhaust stroke and intake valve 18 not being opened until after the start of an intake stroke. This strategy is known as "negative valve overlap."

Intake valve 18 opens as soon as a pressure equilibrium at least approximately prevails between intake channel 20 and combustion chamber 12 to prevent flow losses in this way. To deliver the required volume of air to the combustion chamber, the combustion air is injected into combustion chamber 12 with the help of the aforementioned compressor or turbocharger (not shown). This is advantageous at very low loads (<15% of full load) but also at high loads of up to 75% of full load because it allows homogeneous auto-ignition operation.

In the subsequent compression stroke, the gas mixture in combustion chamber 12 is compressed, resulting in an increase in pressure and a corresponding rise in temperature.

Gasoline may be injected through injector 24 in several steps, e.g., shortly before the end of the exhaust stroke and during the intake stroke.

At a higher load, a higher temperature in combustion chamber 12 and/or a higher compression ratio, a "positive valve overlap" could also be used, wherein exhaust valve 28 remains open in intake stroke 48 and in which intake valve 28 already opens toward the end of exhaust stroke 46. With this positive valve overlap, the required amount of residual gas is withdrawn back out of exhaust channel 30 or intake channel 20 into combustion chamber 12 without an increase in pressure and temperature due to compression in combustion chamber 12 at top dead center in the exhaust and refill charge cycle.

By choosing a certain residual gas strategy and/or valve overlap strategy, it is possible to influence pressure p and the temperature in combustion chamber 12 during a compression stroke following intake stroke 48 and thereby influence the point in time of auto-ignition of the injected gasoline.

Toward the end of intake stroke 48 there is thus a certain thermodynamic state in combustion chamber 12 owing to the residual gas strategy and injection strategy selected. The residual gas strategy, the charging pressure and the injection strategy are selected in such a way that this state corresponds to a desired thermodynamic state and thus a desired onset of auto-ignition of the injected fuel.

Figure 2:
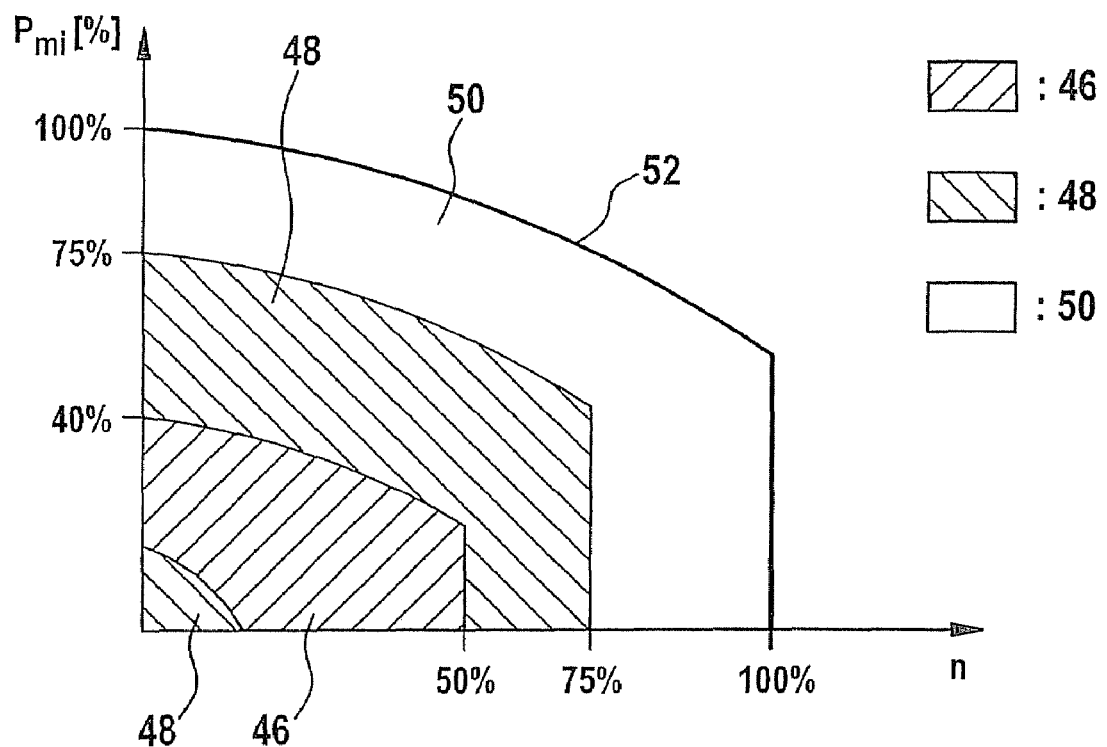
FIG. 2 shows a qualitative diagram of the modes of operation of a gasoline engine.

FIG. 2 shows a diagram of the characteristics map of a gasoline engine. Engine speed n in percentage of maximum engine speed is plotted on the X axis. Indexed mean pressure pmi in percentage of maximum mean pressure is plotted on the Y axis.

A first range 46 represents the part of the characteristics map within which homogeneous auto-ignition operation is possible without supercharging internal combustion engine 10.

A second range 48 represents the portions of the characteristics map which may additionally be utilized for homogeneous auto-ignition operation by supercharging internal combustion engine 10.

A third range 50 represents the portion of the characteristics map within which internal combustion engine 10 requires spark ignition.

A line 52 represents full load for the internal combustion engine.

What is claimed is:

1. A method for operating an internal combustion engine that operates according to the Otto principle, the method comprising:
   injecting fuel directly into a combustion chamber;
   igniting the fuel by auto-ignition; and
   controlling an overpressure at which combustion air is injected into the combustion chamber as a function of a predefined ratio of combustion air and residual gas.

2. The method according to claim 1, which the fuel is gasoline.

3. The method according to claim 1, wherein the overpressure at which the combustion air is injected into the combustion chamber is controlled in such a way that a residual gas content of about maximum 35% is established.

4. The method according to claim 3, wherein the residual gas content is about maximum 30%.

5. The method according to claim 1, wherein the controlling of the overpressure at which the combustion air is injected into the combustion chamber is further as a function of a predefined ratio of combustion air and fuel.

6. The method according to claim 5, wherein the overpressure at which the combustion air is injected into the combustion chamber is controlled in such a way that a substoichiometric fuel-air mixture $\lambda>1$ is established.

7. The method according to claim 6, wherein $\lambda>1.5$.

8. The method according to claim 6, wherein $\lambda$ is about 1.8.

9. The method according to claim 5, wherein the overpressure at which the combustion air is injected into the combustion chamber is controlled in such a way that a stoichiometric fuel-air mixture ($\lambda=1$) is established.

10. The method according to claim 5, further comprising controlling an internal or external exhaust gas recirculation as a function of an instantaneous load in such a way that the predefined ratio of combustion air and residual gas and the predefined ratio of combustion air and fuel is established.

11. The method according to claim 10, wherein the overpressure at which the combustion air is injected into the combustion chamber is controlled as a function of the predefined ratio of combustion air and residual gas in such a way that a residual gas content in supercharged operation corresponds substantially to a residual gas content in nonsupercharged operation.

12. The method according to claim 1, wherein the overpressure is controlled in such a way that a charging pressure in closing at least one intake valve of a cylinder is greater than 2 bar absolute.

13. The method according to claim 12, wherein the charging pressure is up to 2.3 bar absolute.

14. The method according to claim 1, further comprising controlling a position of a combustion center point through at least one injection point in time in such a way that it is in an area of an ignition top dead center.

15. The method according to claim 14, wherein a start of injection (SOI) is in a range of 180° crank angle<SOI<360° crank angle before the ignition top dead center.

16. The method according to claim 1, wherein for injection of small quantities of fuel, in multiple injections, the fuel is injected at low pressure, and large quantities of fuel are injected at high pressure.

17. The method according to claim 1, further comprising controlling an internal or external exhaust gas recirculation as a function of an instantaneous load in such a way that the predefined ratio of combustion air and residual gas is established.

18. The method according to claim 17, wherein the overpressure at which the combustion air is injected into the combustion chamber is controlled as a function of the predefined ratio of combustion air and residual gas in such a way that a residual gas content in supercharged operation corresponds substantially to a residual gas content in nonsupercharged operation.

19. A computer program containing instructions which when executed by a processor perform the following method for operating an internal combustion engine that operates according to the Otto principle:
   injecting fuel directly into a combustion chamber;
   igniting the fuel by auto-ignition; and
   controlling an overpressure at which combustion air is injected into the combustion chamber as a function of a predefined ratio of combustion air and residual gas.

20. A control/regulating device for performing the following method for operating an internal combustion engine that operates according to the Otto principle:
   injecting fuel directly into a combustion chamber;
   igniting the fuel by auto-ignition; and
   controlling an overpressure at which combustion air is injected into the combustion chamber as a function of a predefined ratio of combustion air and residual gas.

* * * * *